US011333519B2

(12) United States Patent
McGill et al.

(10) Patent No.: US 11,333,519 B2
(45) Date of Patent: May 17, 2022

(54) DYNAMIC MAP GENERATION WITH FOCUS ON CONSTRUCTION AND LOCALIZATION FIELD OF TECHNOLOGY

(71) Applicant: TOYOTA RESEARCH INSTITUTE, INC., Los Altos, CA (US)

(72) Inventors: Stephen G. McGill, Cambridge, MA (US); Guy Rosman, Newton, MA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 242 days.

(21) Appl. No.: 16/662,994

(22) Filed: Oct. 24, 2019

(65) Prior Publication Data
US 2021/0123764 A1 Apr. 29, 2021

(51) Int. Cl.
*G01C 21/36* (2006.01)
*G01C 21/34* (2006.01)
*G05D 1/00* (2006.01)
*G06F 16/29* (2019.01)

(52) U.S. Cl.
CPC ..... *G01C 21/3614* (2013.01); *G01C 21/3415* (2013.01); *G01C 21/3461* (2013.01); *G05D 1/0088* (2013.01); *G06F 16/29* (2019.01); *G05D 2201/0213* (2013.01)

(58) Field of Classification Search
CPC ............ G01C 21/3614; G01C 21/3461; G01C 21/3415; G01C 21/3811; G01C 21/32; G05D 1/0088; G05D 2201/0213; G05D 1/0212; G05D 1/0274; G06F 16/29; G06F 16/23; G06T 11/206
See application file for complete search history.

(56) References Cited

U.S. PATENT DOCUMENTS

| 7,421,334 | B2 | 9/2008 | Dahlgren et al. |
| 8,457,821 | B2 | 6/2013 | Ferguson et al. |
| 8,527,199 | B1 * | 9/2013 | Burnette ............... G08G 1/0141 701/450 |
| 10,099,706 | B2 | 10/2018 | Hunt |
| 10,215,572 | B2 * | 2/2019 | Urano .................... G01C 21/32 |
| 10,520,319 | B2 * | 12/2019 | Zhu ....................... G08G 1/0129 |
| 2018/0061237 | A1 | 3/2018 | Erickson et al. |
| 2018/0066946 | A1 * | 3/2018 | Booth .................... G01C 21/32 |

* cited by examiner

*Primary Examiner* — Rami Khatib
(74) *Attorney, Agent, or Firm* — Seyfarth Shaw LLP

(57) ABSTRACT

Systems and methods for generating efficient planning routes for vehicles, including autonomous and semi-autonomous vehicles are presented. A route planner may generate dynamic maps and routes that reduces the uncertainty of road-agent environmental and behavioral data in an efficient manner. Route planning may be accomplished using a statistical approach in which known data from one geographic or behavioral feature set may be used and relied upon by a vehicle in another geographical and behavioral context to estimate the environmental and behavioral data relevant to the vehicles current operation.

18 Claims, 4 Drawing Sheets

DYNAMIC MAP GENERATION WITH FOCUS ON CONSTRUCTION AND LOCALIZATION FIELD OF TECHNOLOGY

The present disclosure relates to map generation for vehicle navigation, and more particularly to creation of dynamic maps and planned routes for autonomous and semi-autonomous vehicles.

BACKGROUND

The behaviors of drivers in a given geographic area may generally differ in some degree from the behaviors of drivers in a different geographic area. For example, drivers in a majority of geographic areas may generally avoid entering an intersection if they will be unable to clear the intersection before they are presented with a red light. Drivers in other geographic areas (such as major cities) may enter an intersection without regard to whether they will be able to clear the intersection before presented with a red light.

Understanding how drivers generally behave in a given geographic area may be important when deploying autonomous and semi-autonomous vehicles to that area. Route planning of the geographic area prior to deployment may involve a vehicle driving within the geographic area to collect driving data indicating the behaviors of these drivers. Driving arbitrary routes to collect this data, however, may not be the most efficient manner of collecting this data.

SUMMARY

Aspects of the present disclosure provide systems and methods to for planning a route for a vehicle. According to one aspect, a method may generate a first map based upon a first feature dataset in a database. The database may include a plurality of feature datasets. A first route may be generated based on the first map. Vehicle operational data may be collected as a second feature dataset. The second feature dataset may be compared to the plurality of feature datasets in the database. The first map may be updated to a second map based on the similarity of the second feature dataset to a third feature dataset in the database.

According to another aspect of the present disclosure, a system for generating a vehicle route is disclosed. A database may include a plurality of feature datasets. A map generator may be configured to generate a first map based upon a first feature dataset in the database. A planning module may be configured to generate a first route based on the first map. At least one sensor may be configured to collect vehicle operational data as a second feature dataset. A processor may be configured to compare the second feature dataset to the plurality of feature datasets in the database. The first map may be updated to a second map based on the similarity of the second feature dataset to a third feature dataset in the database.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

According to aspects of the present disclosure, systems and methods for generating efficient planning routes for vehicles, including autonomous and semi-autonomous vehicles are presented. A route planner may generate dynamic maps and routes that reduces the uncertainty of road-agent environmental and behavioral data in an efficient manner. Traditional route planning may be implemented based solely on known-data obtained from the precise environmental and behavioral data previously obtained. This methodology may be impractical and costly, as it requires a census-type approach of exploring and collecting data for innumerable feature sets. Alternatively, and as described herein, route planning may be accomplished using a statistical approach in which known data from one geographic or behavioral feature set may be used and relied upon by a vehicle in another geographical and behavioral context to estimate the environmental and behavioral data relevant to the vehicles current operation. Using this representative information lessens the need for direct, empirical data and saves the time and cost of collecting and storing vast amounts of information and analysis.

Figure 1:
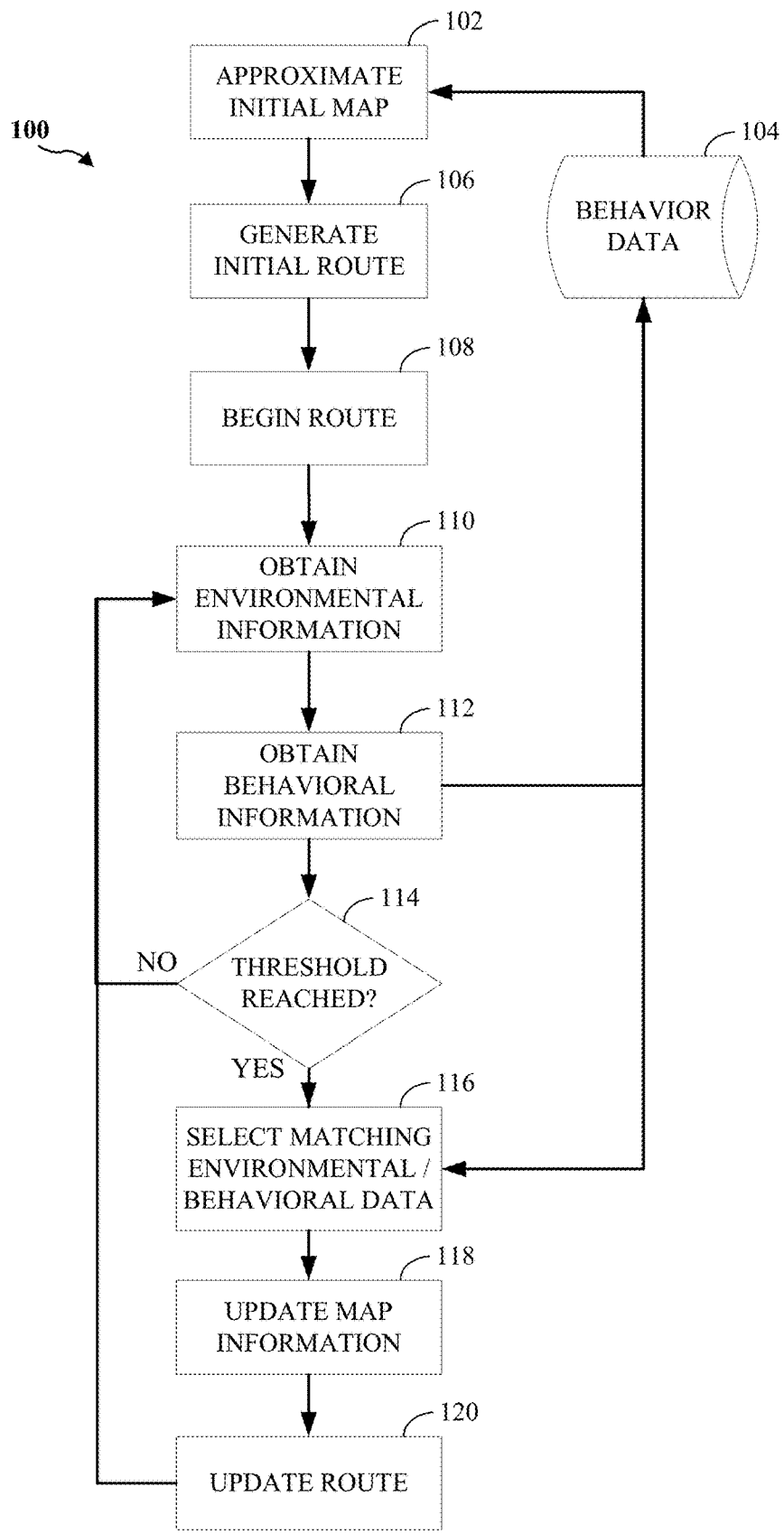
FIG. 1 depicts a method of planning a route according to an aspect of the present disclosure.

FIG. 1 depicts an illustrative method 100 of planning a route according to an aspect of the present disclosure. As shown in block 102, a route planner may approximate initial map information based on a first feature, such as environmental or behavioral data, selected from a database 104. A feature could take the form of, for example, a geographic area (or other geographic dataset), a time of day, weather conditions, demographic information, a population density, or a given spatiotemporal feature, or the like. The data from the first feature may be obtained from the database 104 that may include or be linked to additional publically available sources including Internet or database resources for imagery, maps, business records, social media sites, crowd-sourced data, deed registries, drone or UAV data, or the like.

While the following description may at times describe a geographic area as the feature, it will be understood by those of skill in the art that any one or more other features may be used instead. The route planner, as described herein, may take the form of a computing device in the vehicle, a cloud server, a mobile device, or any other device (or combination of devices) capable of performing the route planning functions described herein.

The route planner may generate an initial route, shown in block 106, based on the approximated map information. As shown in block 108, a vehicle may being to operate along the initial route. As shown in block 110, the vehicle may generate map information of the vehicle's environment. According to one aspect, generating map information may include, for example, using sensors to gather sensor input from one or more sensors, and using the sensor input (perhaps in combination with other data) to generate map information. The sensors may take the form of LIDAR, RADAR, cameras, photoelectric sensors, or any combination of these or other sensors, as described in greater detail below.

According to one example, a vehicle may be operating according to a feature configured to reduce the uncertainty of road-agent behavior on crowded one-way streets in a particular environment. Accordingly, the route planner may approximate map information based on database-selected behavioral information for crowded one-way streets. The route planner may generate an initial route based on the approximated map information to provide a vehicle, operating along the initial route, with maximum exposure to crowded one-way streets.

As shown in block 112, the vehicle, while operating along the initial route, also may record its own behavioral data and obtain behavioral data of road agents (e.g., other vehicles) around the vehicle. Obtaining the behavioral datasets of other road-agents may involve using sensor inputs and other associated data. As the vehicle travels along the route, the obtained behavioral and environmental datasets, may be recorded and transmitted back to the database 104. The level of uncertainty regarding the feature (crowded one-way streets) may be decreased due to the increase in empirical data obtained by the vehicle. The route planner is thusly able to reduce the uncertainty of the behavior of other road agents in the geographic area.

As shown in block 114, the route planner may define a threshold amount of behavioral data to obtain and record. If the threshold level of data has yet to be obtained the route planning process may continue to collect environmental and behavioral data until the threshold is reached. Upon reaching the threshold, as shown in block 116, the route planner may select from the database 104, a set of environmental/behavioral data for a given geographic area (or information having any given feature or features) such that the data in the selected set is collectively similar to the environmental/behavioral data obtained by the vehicle. For example, the route planner may determine that the driving behaviors of road agents in Austin, Tex. are similar to the driving behaviors of road agents in the vehicle's current geographic area. Exemplary behavioral feature sets a vehicle may identify include, without limitation, behavior at stop signs in the current geographic area, behavior at on a given type of road in the current geographic area, behavior at on a given type of road anywhere, or the like.

As shown in block 118, the route planner may update map information based on the dataset selected from the database and the behavior dataset obtained by the vehicle. The route planner may update the map information with data obtained from the environmental/behavioral database 104 to include known feature dataset that closely resembles the dataset of the current environment or behavioral profile. As shown in block 120, the route planner may further update the current route based on the updated map information. While the vehicle is operating on the updated route, the vehicle may continue to generate map information and obtain environmental and behavioral information of the environment and road agents around the vehicle. Accordingly, the route planner's iterative process allows the vehicle to obtain environmental and behavioral information repeatedly while operating along successively more-efficient routes. As such, the route planner is able to reduce the uncertainty of road-agent behavior in the geographic area in a more efficient manner (e.g., more quickly) than if the vehicle were to continue operating on the initial route.

According to one aspect of the disclosure, the route planner initially may have selected a set of environmental and behavioral information for a city, such as the city of Austin, Tex., for example. Despite the vehicle being located in another geographic location, the route planner may estimate that the current environment and behavioral profile of road agents is closely analogous to known environmental and behavioral data from the geographic area and road agents of Austin, Tex. In a subsequent iteration, after the vehicle obtains additional environmental and behavioral data while operating on the updated route, the route planner may determine that driving environment and behaviors of road agents in the current geographic are actually more similar to the driving behaviors of road agents in San Diego, Calif. than those of Austin, Tex. Accordingly, the route planner may select the set of environmental and behavioral data for the city of San Diego, and may generate an updated route based on this selected data as well as the behavioral data obtained by the vehicle. The route planner may also segment the feature data across multiple known environmental and behavioral data sets. For example, the route planner may determine that the driving behaviors of road agents at stop signs in Austin are more similar than San Diego and therefore may retain the dataset related to "behavior of road agents at stop signs" from the Austin data set, while updating other feature sets to those of San Diego. That is, the data set for an identified feature may be discretely segmented and applied on a per-feature basis.

Figure 2:
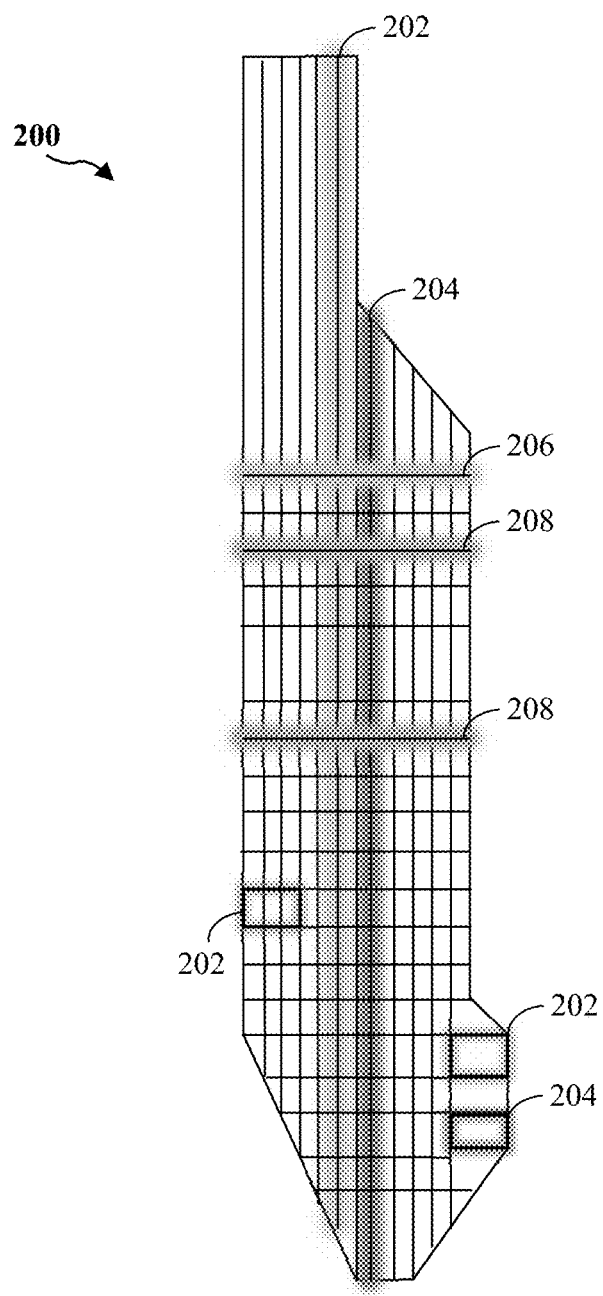
FIG. 2 depicts an exemplary heat map according to an aspect of the present disclosure.

According to an aspect of the present disclosure, the route planner may generate a heat map, or prioritized list, approximating the amount of information estimated to be gained by a vehicle obtaining behavior information from respective areas of a map. The route planner may consequently generate routes based on the generated heat map. FIG. 2 depicts an illustrative heat map 200 according to one aspect of the present disclosure. The heat map 200 may be in the form of a geographical area, such as the map shown in FIG. 2, or may be a prioritized list, grid, or other representation known in the art. The heat map 200 may include identified areas, routes or other objects and locations for which the system has a level of certainty or uncertainty.

The heat map 200 may approximate the amount of information to be gained, given the amount of known environmental and behavioral information already known, if the vehicle were to travel that route or area. For example, the heat map 200 may include routes or areas identified to a first information gain 202. Areas identified or classified according to the first information gain 202 may, for example, indicate that little information is known about the route or area. As described herein, a route planner may make use of this information to avoid such a route or area due to the lack of information. Conversely, the route planner may choose, given the lack of information in the first information gain 202 areas, to seek out such areas to gain additional information about that route or area. Similarly, areas identified at other gain levels, including a second information gain 204, third information gain 206 and fourth information gain 208, may be used by the route planner to identify areas of information according to the level or amount of information to be gained by observing the areas with the system sensors.

While the heat map 200 of FIG. 2 is shown as a geographic map with overlaid gain levels, one skilled in the art will appreciate that other prioritization and classification mechanisms may be implemented without deviating from the scope of the present disclosure.

The route planner, depending on the operational mode of the vehicle may choose to seek out areas that contain known and favorable data to provide a more efficient and convenient route. Alternatively, the route planner may implement a route to avoid areas where data is known, either because the known data presents unfavorable route conditions that outweigh the uncertainty of the unknown data areas, or because the vehicle is operating in a learning mode to explore and gather additional environmental and behavioral information regardless of the route's favorability.

Figure 3:
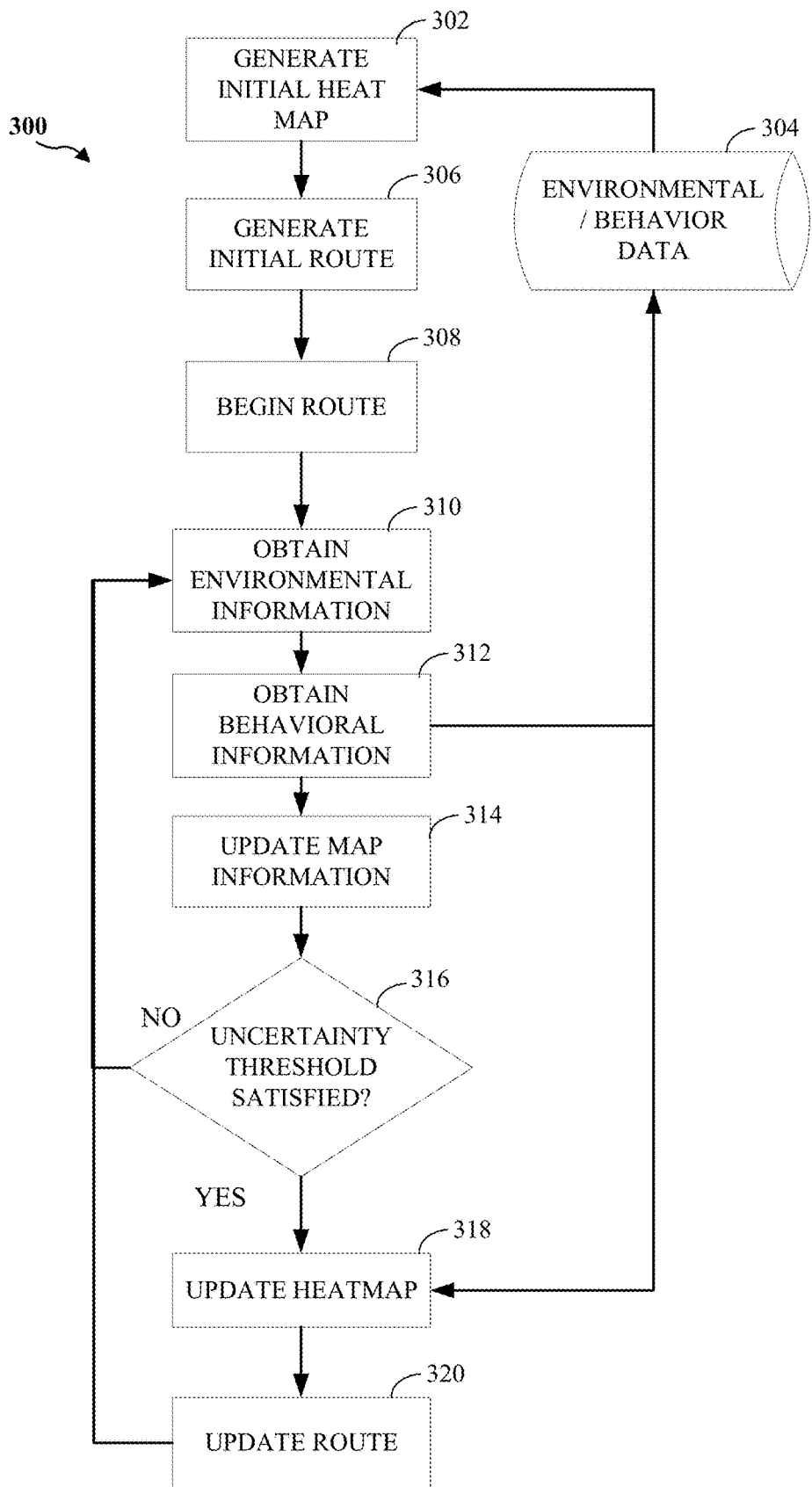
FIG. 3 depicts a method of generating a heat map according to an aspect of the present disclosure.

FIG. 3 depicts an illustrative method 300 of generating and using a heat map according to an aspect of the present disclosure. As shown in block 302, an initial heat map may be generated based on known data from an environmental and behavior database 304. The initial heat map and route planning may identify one or more features that, if additional data were collected, would reduce the uncertainty of data related to those features. For example, an initial heat map may indicate that uncertainty of road-agent behavior in a given environment may be significantly reduced by obtaining road-agent behavior on certain crowded one-way streets. Another significant amount of uncertainty would also be reduced by obtaining road-agent behavior on certain bridges at night, though to a lesser degree than that of the crowded one-way streets feature. As shown in block 306, the route planner may generate an initial route along crowded one-way streets. As shown in block 308, the vehicle may being traveling along the route. Based on environmental and behavioral data obtained from a vehicle operating along the initial route, as shown in blocks 310 and 312, the route planner may update the heat map, shown in block 314, to reflect the collection of that data. The route planner may include a threshold determination, as shown in block 316, that determines if the amount of the data collected for the prioritized feature (e.g., crowded one-way streets) is sufficient to reduce the uncertainty associated with the feature below a desired level. If there is not sufficient data, the vehicle may continue along the route gathering data. The route planner may determine the amount of data collected for the first feature is sufficient. Accordingly, the amount of information to be gained by driving the crowded one-way streets has decreased significantly since behavior information has already been collected from these areas. As shown in block 318, the route planner may update the heat map to reflect this reduction in uncertainty. The updated heat map may now indicate that uncertainty of road-agent behavior would be most reduced by obtaining road-agent behavior on the identified bridges, and the route planner may generate an updated planning route along these bridges, as shown in block 320.

The set of environmental and behavioral information (selected from the database 104, 304) having one or more given features does not need to be data having any discrete notions of those features. For example, behavior information may be represented by a feature vector $x=[f_0, f_1, f_2, f_3, \ldots, f_n]$ where $f_0-f_n$ are values of respective features—e.g., city, type of road, type of road agent, time, weather, etc. A difference function $f(x_1, x_2)$ may output a difference value between a first dataset (represented by vector $x_1$) and a second dataset (represented by vector $x_2$). The difference function may be trained based on previously-labeled similarities between respective environmental and behavioral datasets. The difference function also may be used to determine a similarity between environmental and behavioral datasets in the database and environmental and behavioral datasets obtained by the vehicle.

Figure 4:
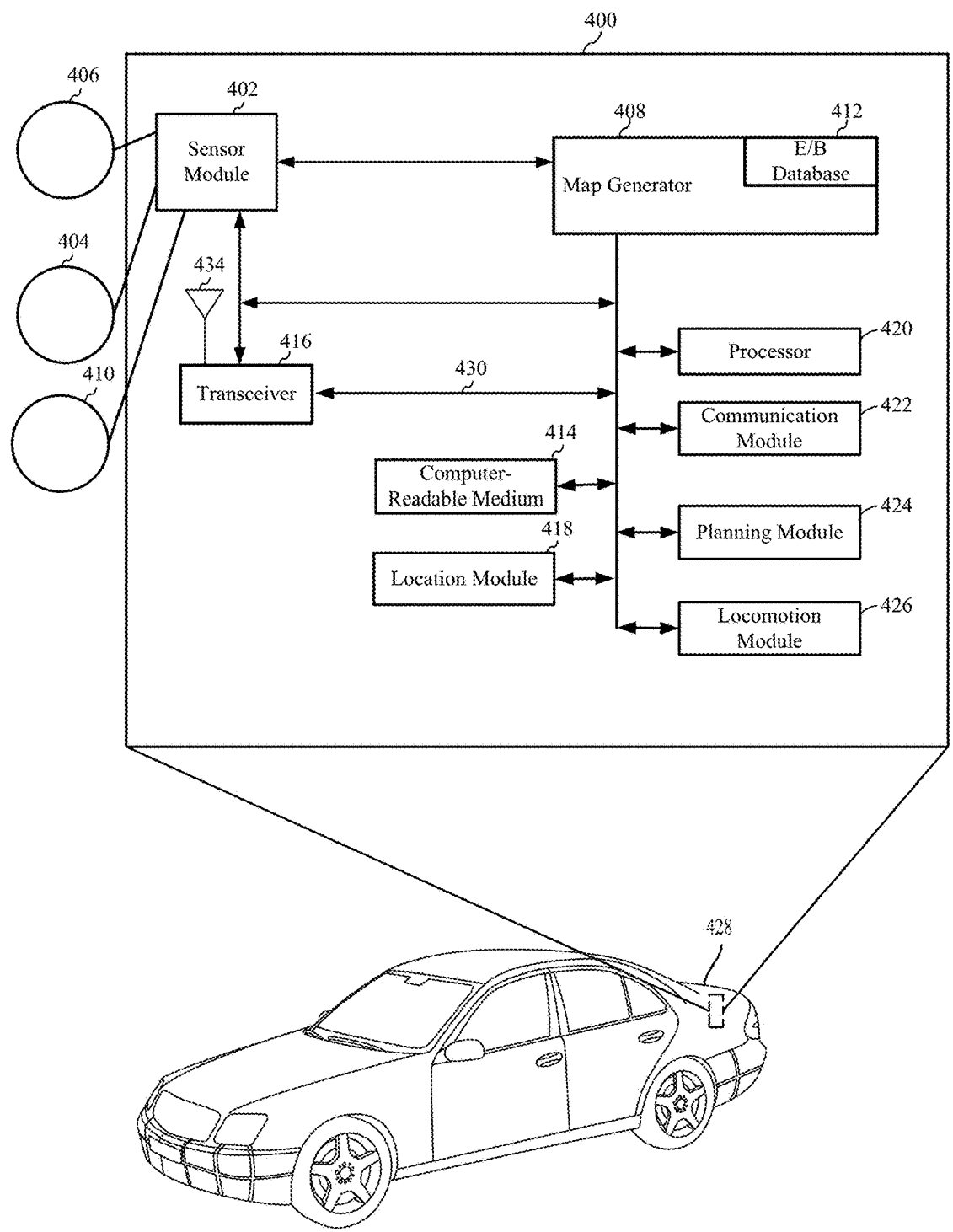
FIG. 4 depicts a hardware implementation for a dynamic map generation system according to aspects of the present disclosure.

FIG. 4 is a diagram illustrating an example of a hardware implementation for a map generation system 400, according to aspects of the present disclosure. The map generation system 400 may be a component of a vehicle, a robotic device, or other device. For example, as shown in FIG. 4, the map generation system 400 may be a component of a car 428. Aspects of the present disclosure are not limited to the map generation system 400 being a component of the car 428, as other devices, such as a bus, boat, drone, simulator, or robot, are also contemplated for using the map generation system 400. The car 428 may be autonomous or semi-autonomous.

The map generation system 400 may be implemented with a bus architecture, represented generally by a bus 430. The bus 430 may include any number of interconnecting buses and bridges depending on the specific application of the map generation system 400 and the overall design constraints. The bus 430 may link together various circuits including one or more processors and/or hardware modules, represented by a processor 420, a communication module 422, a location module 418, a sensor module 402, a locomotion module 426, a planning module 424, and a computer-readable medium 414. The bus 430 may also link various other circuits such as timing sources, peripherals, voltage regulators, and power management circuits, which are well known in the art, and therefore, will not be described any further.

The map generation system 400 may include a transceiver 416 coupled to the processor 420, the sensor module 402, a map generator 408, an environmental and behavioral database (EB) database 412, the communication module 422, the location module 418, the locomotion module 426, the planning module 424, and the computer-readable medium 414. The transceiver 416 is coupled to an antenna 434. The transceiver 416 communicates with various other devices over a transmission medium. For example, the transceiver 416 may receive commands via transmissions from a user or a remote device. As another example, the transceiver 416 may transmit driving statistics and information from the map generator 408 to a server (not shown).

The map generator 408 may include the processor 420 coupled to the computer-readable medium 414. The processor 420 may perform processing, including the execution of software stored on the computer-readable medium 414 providing functionality according to the disclosure. The software, when executed by the processor 420, causes the map generation system 400 to perform the various functions described for a particular device, such as the car 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406, a second sensor 404, and a third sensor 410. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. The third sensor 410 may include an in-cabin camera for capturing raw video or images of the interior environment of the car 428. Of course, aspects of the present disclosure are not limited to the aforementioned sensors as other types of sensors, such as, for example, thermal, sonar, and/or lasers are also contemplated for either of the sensors 404, 406. The measurements of the sensors 404, 406, 410, 406 may be processed by one or more of the processor 420, the sensor module 402, the map generator 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The sensors 404, 406, 410 may be coupled to the car 428 or may be in communication with the car 428.

The location module 418 may be used to determine a location of the car 428. For example, the location module 418 may use a global positioning system (GPS) to determine the location of the car 428. The communication module 422 may be used to facilitate communications via the transceiver 416. For example, the communication module 422 may be configured to provide communication capabilities via different wireless protocols, such as WiFi, long term evolution (LTE), 3G, etc. The communication module 422 may also be used to communicate with other components of the car 428 that are not modules of the map generator 408.

The locomotion module 426 may be used to facilitate locomotion of the car 428. As an example, the locomotion module 426 may control movement of the wheels. As another example, the locomotion module 426 may be in communication with a power source of the car 428, such as an engine or batteries. Of course, aspects of the present disclosure are not limited to providing locomotion via wheels and are contemplated for other types of components for providing locomotion, such as propellers, treads, fins, and/or jet engines.

The map generation system 400 may also include the planning module 424 for planning a route or controlling the locomotion of the car 428, via the locomotion module 426, based on the analysis performed by the map generator 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The map generator 408 may be in communication with the sensor module 402, the transceiver 416, the processor 420, the communication module 422, the location module 418, the locomotion module 426, the planning module 424, and the computer-readable medium 414. In one configuration, the map generator 408 may receive sensor data from the sensor module 402. The sensor module 402 may receive the sensor data from the sensors 404, 406, 410. According to aspects of the disclosure, the sensor module 402 may filter the data to remove noise, encode the data, decode the data, merge the data, extract frames, or perform other functions. In an alternate configuration, the map generator 408 may receive sensor data directly from the sensors 404, 406, 410.

As shown in FIG. 4, the map generator 408 may be in communication with the planning module 424 and the locomotion module 426 to generate a route map, plan a route, and operate the car 428 according to the generated map. As described herein, the map generator 408 may rely on known environmental and behavioral data from EB database 412 to generate an initial map according to one or more features in the database. As the car 428 progresses along the route, additional environmental and behavioral data may be obtained from the sensor module 402, locomotion module 426 and others. The additional data may be used to refine or change the map in which the car 428 is currently operating. The map generator may adapt, or update the initial map with the newly obtained information and, along with the planning module 424, update the route on which the car 428 is operating.

According to one aspect of the disclosure, the map generator 408 may also generate a heat map representative of one or more levels of feature data uncertainty. The heat map may represent various levels of feature data according to how much (or little) data is known about the feature. The planning module 424 may use the heat map generated by the map generator 408 to route the car 428. The planning module 424 may implement the heat map in a number of ways, as described herein. The planning module 424 may generate a route based on the heat map to avoid areas of high uncertainty when alternative routes through more well-known (low uncertainty) areas is more efficient (i.e., less traffic, faster travel times, or the like).

Alternatively, the planning module 424 may opt to generate a route to seek out areas of high uncertainty identified in the heat map to obtain additional environmental and behavioral data, thus reducing the uncertainty. The planning module 424 may also plan a route through areas of higher uncertainty and avoid areas of low uncertainty because the feature data in the well-known areas is undesirable for an efficient route. For example, a given geographic area may have a low level of uncertainty regarding traffic jams and indicating a traffic jam is very likely given other environmental parameters. As such, the planning module 424 may determine a route along and through areas of higher uncertainty (despite the high uncertainty) because the resulting route is estimated to be more efficient than the route through the known areas with traffic jams.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated with data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for planning a route for a vehicle, the method comprising:
    generating a first map based upon a first dataset of features in a database, wherein the first map is a heat map representative of an uncertainty level of the first dataset of features, the database comprising a plurality of datasets of features;
    generating a first route based on the first map;
    collecting vehicle operational data as a second dataset of features;
    comparing the second dataset of features to the plurality of datasets of features in the database; and
    updating the first map to a second map based on the similarity of the second dataset of features to a third dataset of features in the database.

2. The method of claim 1 wherein the plurality of datasets of features comprise environmental data features.

3. The method of claim 2 wherein the environmental data features are associated with a geographic area.

4. The method of claim 1 wherein the plurality of datasets of features comprise road agent behavioral data.

5. The method of claim 1 wherein the vehicle operational data comprises environmental data.

6. The method of claim 1 further comprising updating the first route to a second route based on the second map.

7. The method of claim 1 further comprising collecting the vehicle operational data until a threshold is met, wherein the step of updating of the first map to the second map is executed upon the collected vehicle operational data exceeding the threshold.

8. The method of claim 1 further comprising collecting the vehicle operational data until an uncertainty threshold is met, wherein the step of updating of the first map to the second map is executed upon the collected vehicle operational data exceeding the uncertainty threshold.

9. The method of claim 8 further comprising updating the first route to a second route based on the uncertainty level of second dataset of features.

10. A system for generating a vehicle route, the system comprising:
    a database comprising a plurality of datasets of features;
    a map generator processor generating a first map based upon a first dataset of features in the database, wherein the first map is a heat map representative of an uncertainty level of the first feature dataset;
    a planning module generating a first route based on the first map, the planning module comprising one or more processors, and
    at least one sensor configured to collect vehicle operational data as a second dataset of features;
    the map generator processor configured to:
    compare the second dataset of features to the plurality of datasets of features in the database; and
    update the first map to a second map based on the similarity of the second dataset of features to a third dataset of features in the database.

11. The system of claim 10, wherein the system comprises an autonomous vehicle.

12. The system of claim 10 wherein the plurality of datasets of features comprise environmental data features.

13. The system of claim 12 wherein the environmental data features are associated with at least one of a geographic area, time-of-day, and weather.

14. The system of claim 10 wherein the plurality of datasets of features comprise road agent behavioral data.

15. The system of claim 10 wherein the vehicle operational data comprises environmental data.

16. The system of claim 10 wherein the processor is further configured to update the first route to a second route based on the second map.

17. The system of claim 10 wherein the at least one sensor is configured to collect the vehicle operational data until a threshold is met, wherein the step of updating of the first map to the second map is executed upon the collected vehicle operational data exceeding the threshold.

18. The system of claim 10 wherein the at least one sensor is configured to collect the vehicle operational data until an uncertainty threshold is met, wherein the step of updating of the first map to the second map is executed upon the collected vehicle operational data exceeding the uncertainty threshold.

* * * * *